(12) United States Patent
Pan

(10) Patent No.: US 6,764,090 B1
(45) Date of Patent: Jul. 20, 2004

(54) BICYCLE WITH A DRIVE SPROCKET DISPOSED IN FRONT OF A SEAT TUBE

(76) Inventor: Liang-Fong Pan, No. 25, Lane 256, Yu-Yuan S. Rd., Lung-Ching Hsiang, Taichung Hsien (TW)

(*) Notice: Subject to any disclaimer, the term of this patent is extended or adjusted under 35 U.S.C. 154(b) by 0 days.

(21) Appl. No.: 10/355,605

(22) Filed: Jan. 31, 2003

(51) Int. Cl.[7] .............................................. B62K 15/00
(52) U.S. Cl. ..................... 280/278; 280/281.1; 280/287
(58) Field of Search ................................ 280/278, 287, 280/281.1, 288.1, 259

(56) References Cited

U.S. PATENT DOCUMENTS

| | | | | |
|---|---|---|---|---|
| 3,802,721 A | * | 4/1974 | Hubbard | 280/287 |
| 4,718,688 A | * | 1/1988 | Sanders | 280/278 |
| 4,895,386 A | * | 1/1990 | Hellestam et al. | 280/287 |
| 4,925,203 A | * | 5/1990 | Buckler | 280/278 |
| 5,947,500 A | * | 9/1999 | McGrane | 280/287 |
| 6,527,291 B1 | * | 3/2003 | Hurtig | 280/288.1 |

* cited by examiner

Primary Examiner—Kevin Hurley
(74) Attorney, Agent, or Firm—Ladas & Parry

(57) ABSTRACT

A bicycle includes front and rear wheels, which are mounted respectively on front and rear ends of a bicycle frame. The bicycle frame has an inclined main tube that extends rearwardly and downwardly from a head tube to a seat tube. A drive sprocket is disposed on the main tube, and is located between the head tube and the seat tube. As such, the total length of the bicycle can be shortened.

2 Claims, 5 Drawing Sheets

BICYCLE WITH A DRIVE SPROCKET DISPOSED IN FRONT OF A SEAT TUBE

BACKGROUND OF THE INVENTION

1. Field of the Invention

This invention relates to a bicycle, more particularly to a bicycle that includes a drive sprocket disposed in front of a seat tube so as to shorten the total length of the bicycle.

2. Description of the Related Art

A conventional bicycle includes a drive sprocket and a crank that are disposed under a seat tube. As there is a need to space the drive sprocket from a driven sprocket by an appropriate distance in order to smooth running of a chain trained on the drive and driven sprockets, the conventional bicycle is relatively long, thereby resulting in difficulties when the bicycle is transported or stored.

SUMMARY OF THE INVENTION

The object of this invention is to provide a bicycle, which includes a drive sprocket disposed in front of a seat tube, so as to shorten the total length of the bicycle.

According to this invention, a bicycle includes a bicycle frame, a wheel unit, and a transmission. The bicycle frame includes an upright head tube, an upright seat tube, and an inclined main tube that has a front end which is connected fixedly to the head tube, and a rear end which is connected fixedly to the seat tube and which is located below the front end. The main tube extends rearwardly and downwardly from the head tube to the seat tube. The wheel unit includes a front wheel mounted rotatably on a front end of the bicycle frame, and a rear wheel mounted rotatably on a rear end of the bicycle frame and having a diameter greater than that of the front wheel. The transmission includes: a drive sprocket disposed rotatably on the main tube and located between the head tube and the seat tube; a crank disposed rotatably on the main tube and connected coaxially and fixedly to the drive sprocket, the crank having two crank arms; two pedals mounted respectively and rotatably on the crank arms; a driven sprocket connected coaxially and fixedly to the rear wheel; and a chain trained on the drive and driven sprockets so as to transfer rotation of the drive sprocket to the driven sprocket.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENTS

Figure 1:
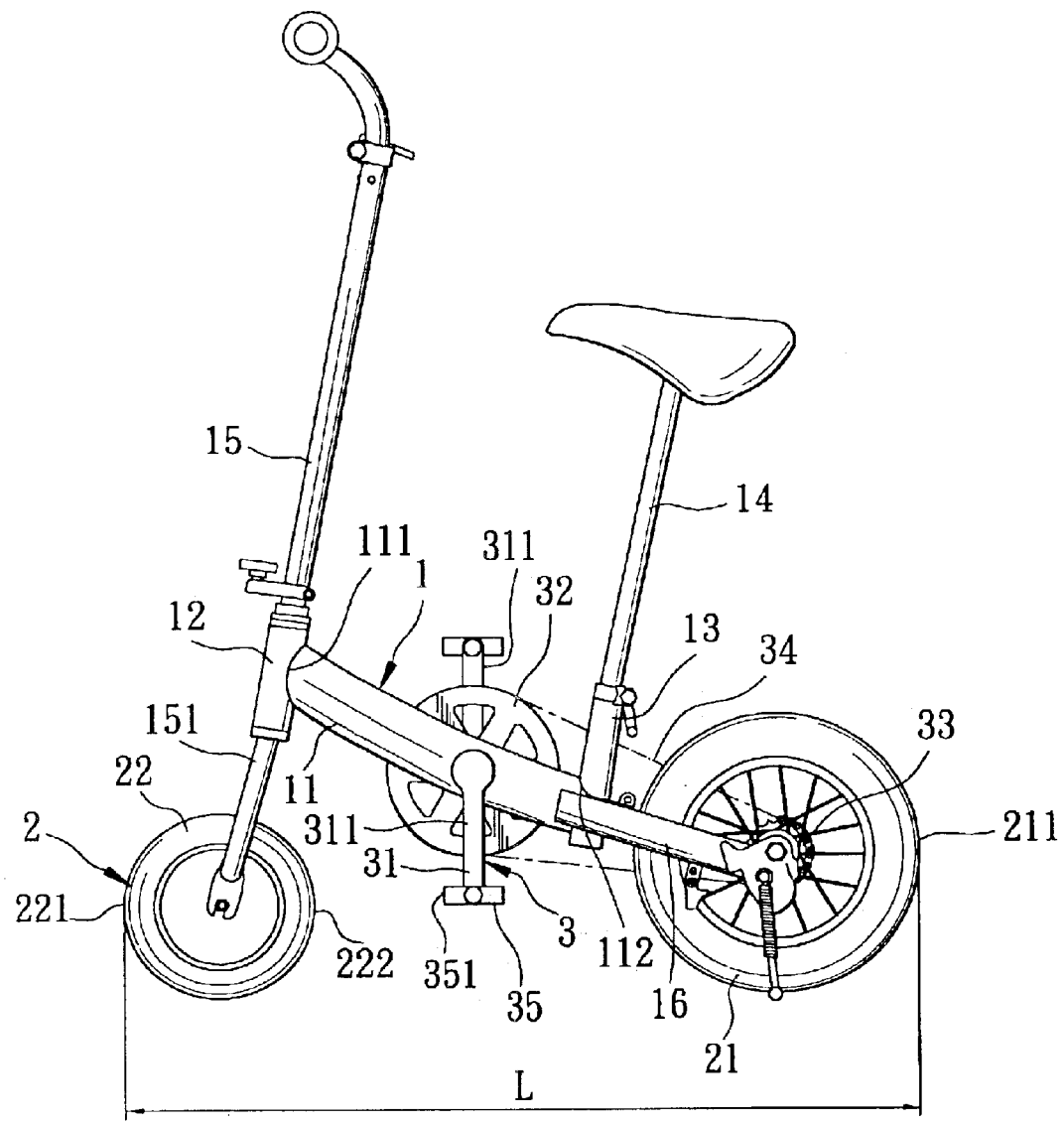
FIG. 1 illustrates the preferred embodiment of a bicycle according to this invention.

Referring to FIG. 1, the preferred embodiment of a bicycle according to this invention is shown to include a bicycle frame 1, a wheel unit 2, and a transmission 3.

The bicycle frame 1 includes an inclined main tube 11, an upright head tube 12, an upright seat tube 13, a seat-supporting rod 14, a handlebar-supporting stem unit 15, and a rear fork 16. The main tube 11 has a front end 111 connected fixedly to the head tube 12, and a rear end 112 connected fixedly to the seat tube 13 and located below the front end 111, and extends rearwardly and downwardly from the head tube 12 to the seat tube 13. The stem unit 15 is disposed on the head tube 12 in a known manner, and has a lower end, which is formed with a front fork 151. The rear fork 16 is connected fixedly to the rear end 112 of the main tube 11.

The wheel unit 2 includes a rear wheel 21 and a front wheel 22. The front wheel 22 is mounted rotatably on the front fork 151 of the stem unit 15 of the bicycle frame 1. The rear wheel 21 is mounted rotatably on the rear fork 16 of the bicycle frame 1, and has a diameter greater than that of the front wheel 22.

The transmission 3 includes a crank 31, a drive sprocket 32, a driven sprocket 33, a chain 34, and two pedals 35. The drive sprocket 32 is disposed rotatably on the main tube 11, and is located between the head tube 12 and the seat tube 13. The crank 31 is disposed rotatably on the main tube 11, is connected coaxially and fixedly to the drive sprocket 32, and has two crank arms 311. The driven sprocket 33 is connected coaxially and fixedly to the rear wheel 21. The chain 34 is trained on the drive and driven sprockets 32, 33 so as to transfer rotation of the drive sprocket 32 to the driven sprocket 33. The pedals 35 are mounted respectively and rotatably on the crank arms 311. The bicycle has a length (L), i.e. the distance between a front edge 221 of the front wheel 22 and a rear edge 211 of the rear wheel 21, which is preferably smaller than 92 cm in order to facilitate transportation and storage of the bicycle.

Figure 2:
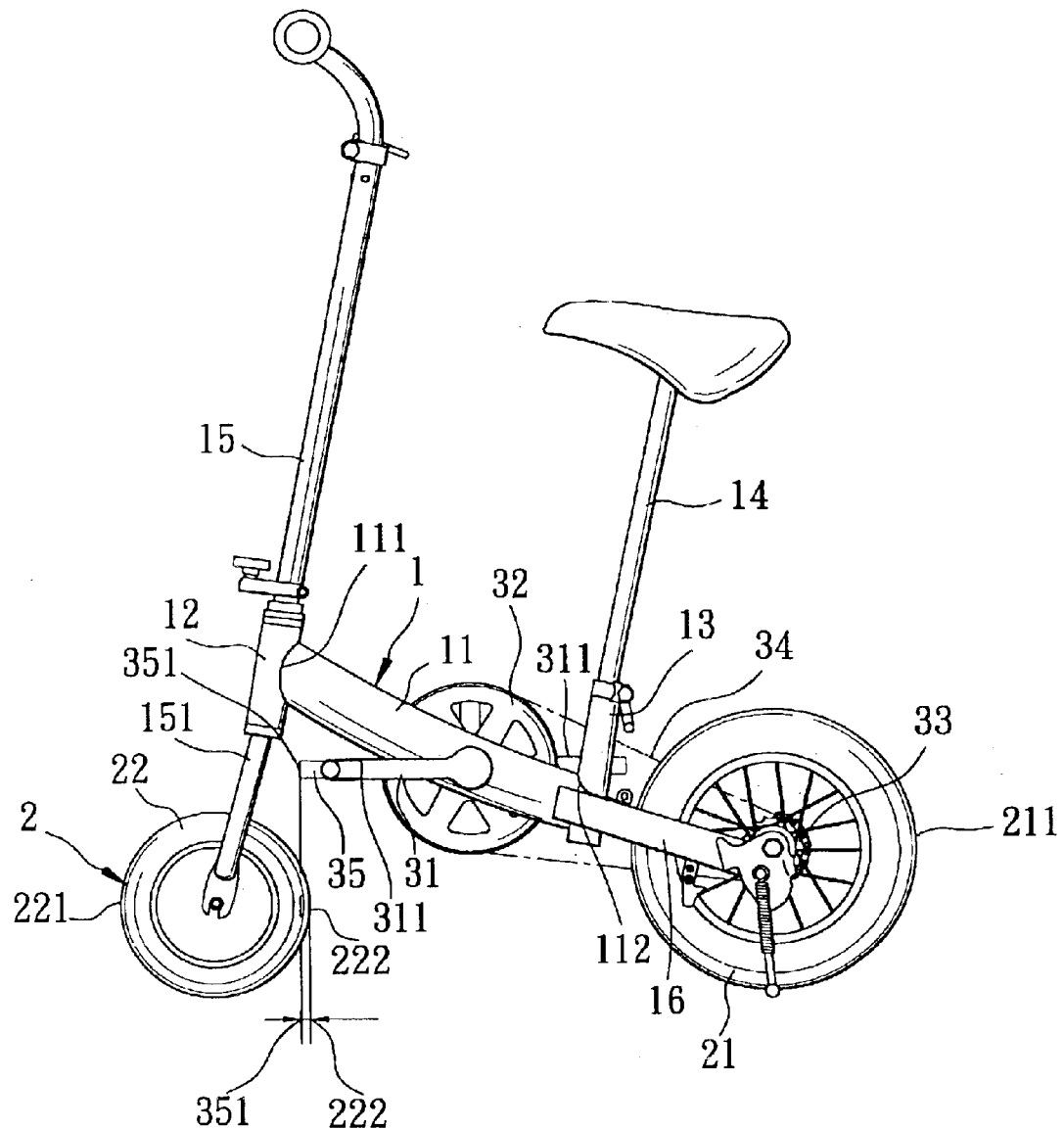
FIG. 2 illustrates the positional relationship between a crank of the preferred embodiment and a rear edge of a front wheel when the crank arms of the crank are disposed at horizontal positions.
Figure 3:
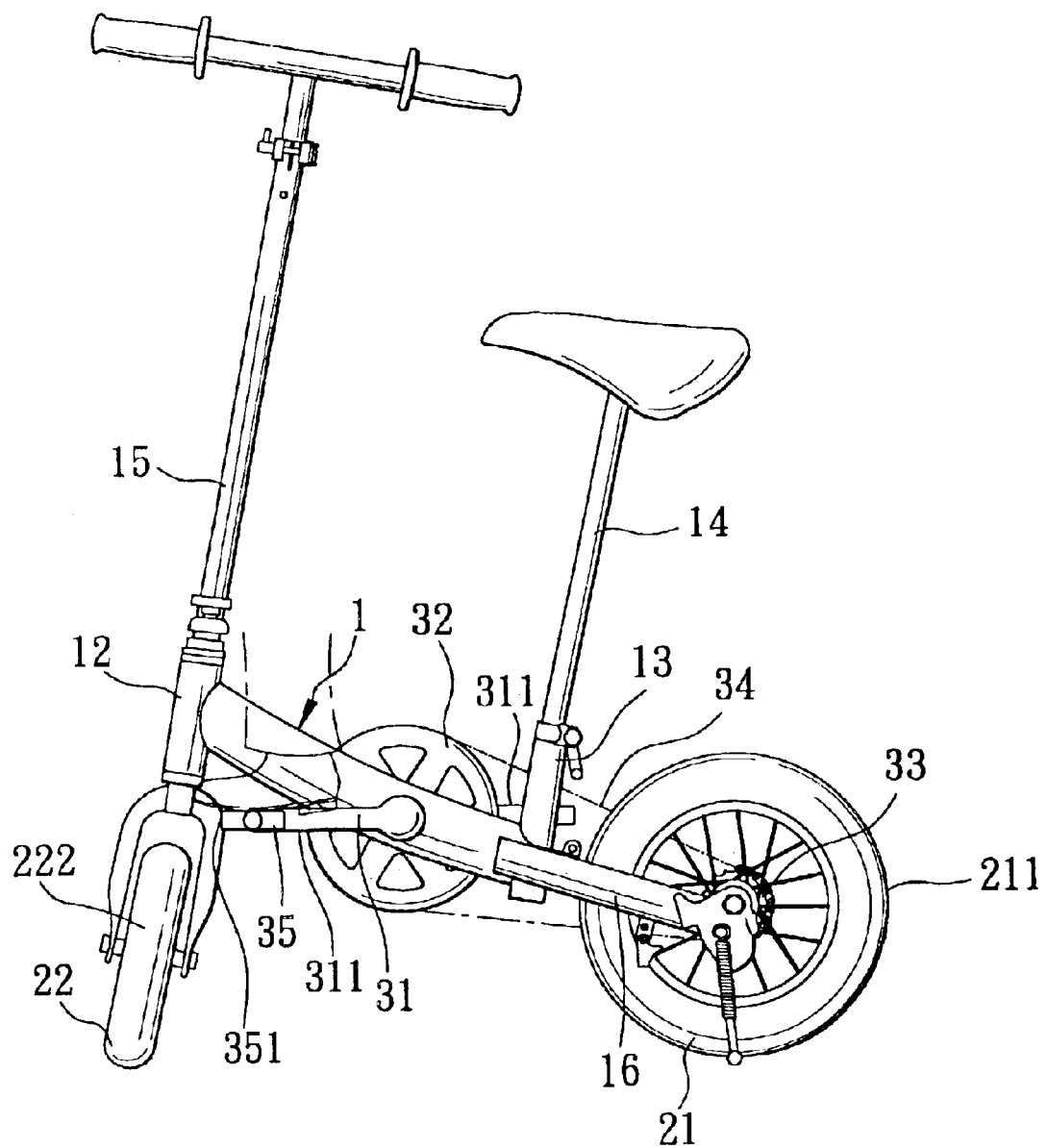
FIGS. 3 and 4 are schematic side and top views of the preferred embodiment which illustrate the positional relationship between the front wheel and the feet of the bicycle rider when the front wheel is rotated.
Figure 4:
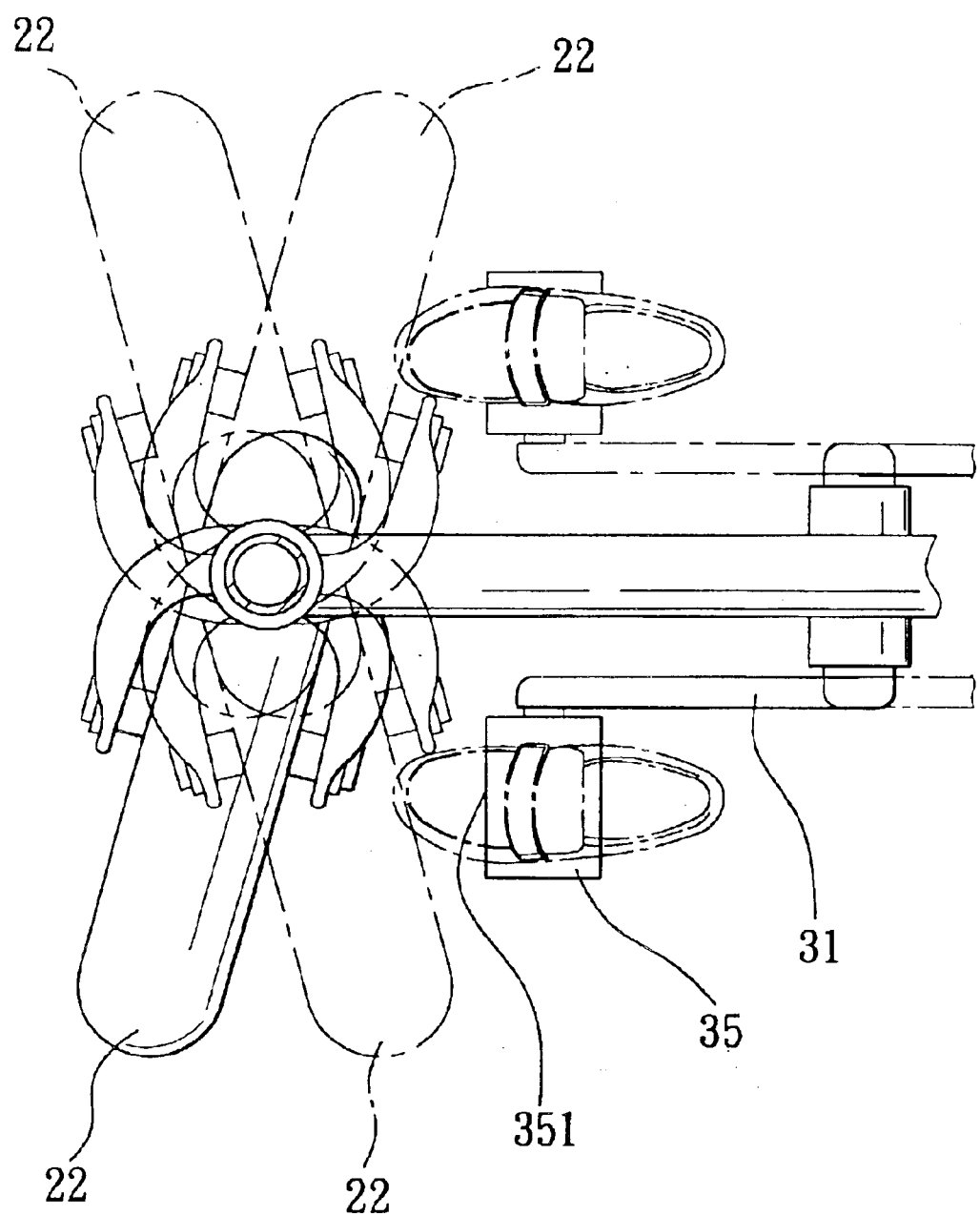

Referring to FIG. 2, when the crank arms 311 are disposed at horizontal positions, a front end of a front one of the crank arms 311 is located in front of and adjacent to a rear edge 222 of the front wheel 22. As such, when a bicycle rider pedals the bicycle so that the front wheel 22 rotates, the rider's feet will not come into contact with the front wheel 22, as shown in FIGS. 3 and 4.

Figure 5:
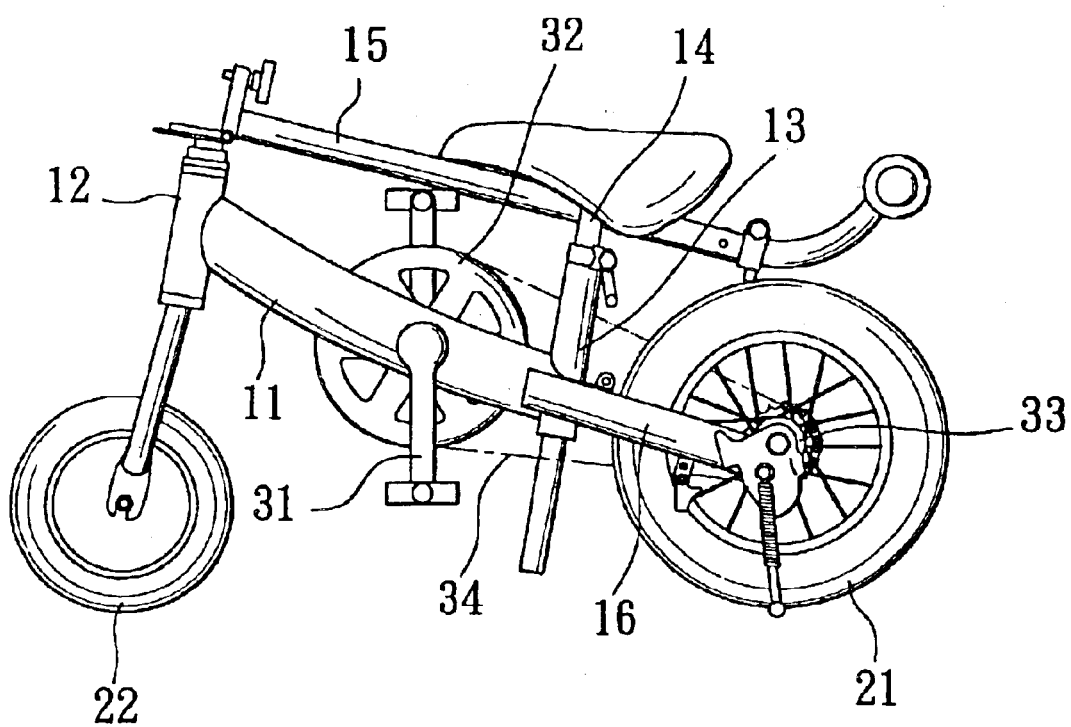
FIG. 5 illustrates the preferred embodiment in a folded state.

Referring to FIG. 5, preferably, the stem unit 15 has a foldable structure, and the seat-supporting rod 14 is locked releaseably on the seat tube 13 in a known manner. When the bicycle is to be transported or stored, the stem unit 15 can be folded, and the seat-supporting rod 14 can be unlocked from the seat tube 13 so as to reduce the size of the bicycle.

With this invention thus explained, it is apparent that numerous modifications and variations can be made without departing the scope and spirit of this invention. It is therefore intended that this invention be limited only as indicated by the appended claims.

What is claimed is:

1. A bicycle comprising:
   a bicycle frame including an upright head tube, an upright seat tube, and an inclined main tube that has a front end which is connected fixedly to said head tube, and a rear end which is connected fixedly to said seat tube and which is located below said front end, said main tube extending rearwardly and downwardly from said head tube to said seat tube;

a wheel unit including a front wheel mounted rotatably on a front end of said bicycle frame, and a rear wheel mounted rotatably on a rear end of said bicycle frame and having a diameter greater than that of said front wheel; and a transmission including a drive sprocket disposed rotatably on said main tube and located between said head tube and said seat tube, a crank disposed rotatably on said main tube and connected coaxially and fixedly to said drive sprocket, said crank having two crank arms, two pedals mounted respectively and rotatably on said crank arms, a driven sprocket connected coaxially and fixedly to said rear wheel, and a chain trained on said drive and driven sprockets so as to transfer rotation of said drive sprocket to said driven sprocket;

wherein a front end of a front one of said crank arms is located in front of and adjacent to a rear edge of said front wheel when said crank arms are disposed at horizontal positions.

2. The bicycle as claimed in claim 1, wherein a front edge of said front wheel and a rear edge of said rear wheel are spaced apart from each other by a distance that is smaller than 92 cm.

* * * * *